United States Patent
Costin et al.

(10) Patent No.: US 9,207,661 B2
(45) Date of Patent: Dec. 8, 2015

(54) DUAL CORE ARCHITECTURE OF A CONTROL MODULE OF AN ENGINE

(75) Inventors: Mark H. Costin, Bloomfield Township, MI (US); Paul A. Bauerle, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 905 days.

(21) Appl. No.: 11/880,449

(22) Filed: Jul. 20, 2007

(65) Prior Publication Data

US 2009/0024775 A1    Jan. 22, 2009

(51) Int. Cl.
| | | |
|---|---|---|
| *G06F 13/00* | (2006.01) | |
| *G05B 19/042* | (2006.01) | |
| *B60L 3/00* | (2006.01) | |
| *G05B 19/048* | (2006.01) | |

(52) U.S. Cl.
CPC .. *G05B 19/0428* (2013.01); *G05B 2219/24187* (2013.01); *G05B 2219/24195* (2013.01); *G05B 2219/24198* (2013.01)

(58) Field of Classification Search
CPC ..... G06F 11/0724; G06F 15/80; G06F 11/16; G06F 11/1662; G06F 11/0793; G06F 11/1637; G06F 11/165; G06F 7/57; G06F 7/575; G05B 2219/24187
USPC ............................................ 701/1, 29, 33–35
See application file for complete search history.

(56) References Cited

U.S. PATENT DOCUMENTS

| | | | |
|---|---|---|---|
| 4,539,642 A | | 9/1985 | Mizuno et al. |
| 5,493,270 A | | 2/1996 | Kondo |
| 5,602,736 A | | 2/1997 | Toya et al. |
| 5,897,596 A | * | 4/1999 | Kabune et al. ................ 701/29 |
| 6,230,094 B1 | | 5/2001 | Ohashi et al. |
| 6,243,629 B1 | * | 6/2001 | Sugimoto et al. ............ 701/29.2 |
| 6,330,499 B1 | | 12/2001 | Chou et al. |
| 6,625,688 B1 | * | 9/2003 | Fruehling et al. ............. 711/109 |
| 6,892,129 B2 | | 5/2005 | Miyano |
| 7,251,551 B2 | | 7/2007 | Mitsueda et al. |
| 7,671,482 B2 | | 3/2010 | Tighe |
| 8,155,824 B2 | | 4/2012 | Sakai et al. |
| 8,712,635 B2 | | 4/2014 | Hashimoto |
| 2002/0045952 A1 | * | 4/2002 | Blemel ............................ 700/2 |
| 2003/0060964 A1 | | 3/2003 | Ozeki et al. |
| 2003/0144778 A1 | | 7/2003 | Miyano |
| 2004/0123201 A1 | | 6/2004 | Nguyen et al. |

(Continued)

FOREIGN PATENT DOCUMENTS

| | | |
|---|---|---|
| DE | 10255614 A1 | 8/2003 |
| DE | 102005037246 A1 | 2/2007 |

OTHER PUBLICATIONS

Terry L. Fruehling; SAE Technical Paper Series 2000-01-1052; "Delphi Secured Microcontroller Architecture"; Mar. 6-9, 2000; 14 pages.

(Continued)

*Primary Examiner* — Khoi Tran
*Assistant Examiner* — Dale Moyer

(57) ABSTRACT

A control system for a control module of a vehicle includes a first integrated circuit (IC) core of a primary processor that generates a first control signal using a central processing unit (CPU). A second IC core of the primary processor generates a second control signal using a second CPU and generates a remedial control signal based on the first control signal and the second control signal.

19 Claims, 3 Drawing Sheets

(56) References Cited

U.S. PATENT DOCUMENTS

| | | |
|---|---|---|
| 2005/0080529 A1 | 4/2005 | Hashimoto et al. |
| 2006/0162986 A1* | 7/2006 | Disser et al. ................ 180/402 |
| 2007/0168712 A1* | 7/2007 | Racunas et al. ................ 714/12 |
| 2007/0180315 A1* | 8/2007 | Aizawa ............................ 714/15 |
| 2008/0215759 A1* | 9/2008 | Maniwa et al. ............... 709/248 |
| 2008/0258253 A1* | 10/2008 | Fey et al. ...................... 257/500 |
| 2009/0013217 A1* | 1/2009 | Shibata et al. ................. 714/47 |
| 2009/0024775 A1* | 1/2009 | Costin et al. ................ 710/107 |
| 2009/0044044 A1* | 2/2009 | Harter et al. ...................... 714/6 |
| 2009/0138137 A1 | 5/2009 | Iwagami et al. |
| 2009/0217092 A1 | 8/2009 | Weiberle et al. |
| 2010/0049909 A1 | 2/2010 | Lasser |
| 2011/0190957 A1 | 8/2011 | Iwagami et al. |
| 2013/0246866 A1 | 9/2013 | Costin et al. |
| 2014/0047299 A1 | 2/2014 | Ikeda |

OTHER PUBLICATIONS

Freescale, MPC564xL: Qorivva 32-bit MCU for Chassis and Safety Applications, http://www.freescale.com/webapp/sps/site/prod_summary.jsp?code=MPC564xL, 2004.

Freescale, MPC5746M: Qorivva 32-bit Multicore MCU for Powertrain Applications, http://www.freescale.com/webapp/sps/site/prod_summary.jsp?code=MPC5746M, 2004.

* cited by examiner

DUAL CORE ARCHITECTURE OF A CONTROL MODULE OF AN ENGINE

FIELD OF THE INVENTION

The present disclosure relates to control systems, and more particularly to verifying the integrity of control signals in vehicle safety-critical control systems.

BACKGROUND OF THE INVENTION

The statements in this section merely provide background information related to the present disclosure and may not constitute prior art.

Control modules are implemented in a variety of systems to process data and provide control signals. Control modules are increasingly using digital processors in cars, trucks, aircraft and other vehicles to control safety-critical functions such as braking and engine control. A primary processor generates control signals based on signals received from various sensors and other devices that monitor operating characteristics such as, but not limited to, engine speed, temperature, pressure, and gear ratio. The primary processor processes signal information using an arithmetic logic unit (ALU). If a control signal becomes corrupted as a result of a defective ALU, the primary processor could command the system to take an incorrect action.

Corrupted control signals can result from other failures and/or errors associated with the primary processor and/or other components of the control module including, but not limited to, random access memory (RAM) hardware failures, RAM data storage corruption, read-only memory (ROM) faults, compiler errors and/or program counter errors. Conventional fault detection and corrective techniques of the primary processor often use a secondary processor on the control module. The secondary processors typically use the ALU of the primary processor to perform its fault detection.

SUMMARY

A control system for a control module of a vehicle includes a first integrated circuit (IC) core of a primary processor that generates a first control signal using a central processing unit (CPU). A second IC core of the primary processor generates a second control signal using a second CPU and generates a remedial control signal based on the first control signal and the second control signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
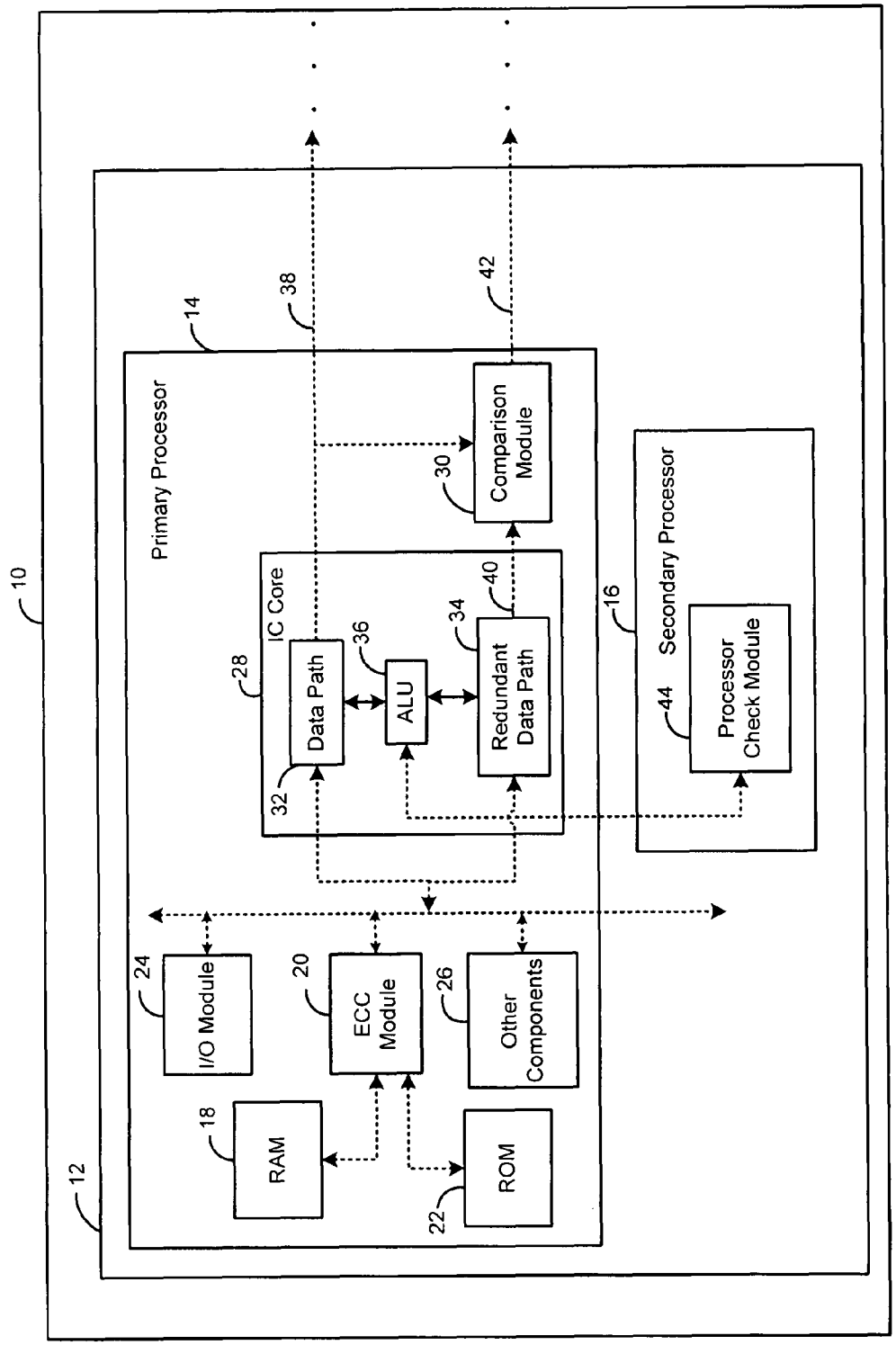
FIG. 1 is a functional block diagram of an exemplary control module according to the prior art.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle 10 is shown according to the prior art. The vehicle 10 may include, but is not limited to, a car, truck, aircraft, or other vehicle. A control module 12 controls one or more functions of the vehicle 10 including, but not limited to, safety-critical functions such as braking, steering, hazard control, and/or engine operation. The control module 12 includes a primary processor 14 that communicates with a secondary processor 16, a random access memory (RAM) 18, an error correction coding (ECC) module 20, read-only memory (ROM) 22, input and/or output (I/O) modules 24, and other components 26.

The RAM 18 stores read, write, and/or volatile control data that is associated with the control of the vehicle 10. The RAM 18 may include, but is not limited to, SDRAM, double data rate (DDR) RAM, or other types of low latency memory. The ROM 22 includes nonvolatile memory such as flash memory and is provided to store critical data such as nonvolatile control code.

The ECC module 20 verifies the integrity of data received from the RAM 18 and/or ROM 22. The ECC module 20 monitors the RAM 18 and the ROM 22 for various forms of data corruption. The ECC module 20 can automatically correct failures detected when data is transmitted from the RAM 18 and/or ROM 22 to the primary processor 14.

The I/O modules 24 may be connected with various sensing modules of the vehicle 10 and may convert analog data to digital signals for transmission to the processor 14. The I/O modules 24 may include, for example, an analog-to-digital (A/D) converter, a pulse-width modulation (PWM) converter, dual-port memory, a controller area network (CAN) bus, a local interconnect network (LIN) bus, and/or devices using a serial peripheral interface (SPI), frequency encoding, a scalable coherent interface (SCI), and/or a single-edge nibble transmission (SENT) medium. Various other devices and/or methods could be used to input sensor data.

The primary processor 14 arranged on the control module 12 performs data and/or control processing that is related to the operation of the vehicle 10. The primary processor 14 includes an integrated circuit (IC) core 28 and a comparison module 30. IC cores, also referred to as core logic chipsets, can include controllers for handling memory functions, a cache for instructions, logic for bus interfaces, and data path functions. The IC core 28 includes a primary data path (data path) 32, a redundant data path 34, and an arithmetic logic unit (ALU) 36.

The data path 32 executes computation operations on data received from various other components within the control module 12 (e.g. the RAM 18 and the ROM 22) and generates a primary control signal 38 (e.g. safety-critical control signal) based on the data. The redundant data path 34 processes the data in parallel with the data path 32 and generates a redundant control signal 40. The redundant data path 34 performs computation operations in similar fashion to that of the data path 32.

The data path 32 and the redundant path 34 share a common ALU 36. The ALU 36 performs arithmetic operations on the data received by the data path 32 and the data path 34. More specifically, the ALU 36 performs calculations on the data to determine the primary and redundant control signals 38 and 40 that control various functions of the vehicle 10.

The comparison module 30 receives the primary control signal 38 and the redundant control signal 40. The comparison module 30 compares the primary and redundant control signals 38 and 40 and determines whether the primary and redundant control signals 38 and 40 are equivalent. If the primary and redundant control signals 38 and 40 are not equivalent, the comparison module 30 generates a remedial (i.e. corrective) control signal 42 based on the comparison. The remedial control signal can include, but is not limited to, commanding an engine of the vehicle 10 to shut down and limiting engine speed.

The secondary processor 16 performs security checks of the primary processor 14 by using a processor check module 44. More specifically, the secondary processor 16 determines whether the ALU 36 is operating properly. The processor check module 44 periodically evaluates the computational integrity of the ALU 36 by transmitting "seed" or predetermined information to the primary processor 14. The primary processor 14 processes the seed data and generates "key" data that is transmitted to the processor check module 44. The processor check module 44 determines whether the ALU 36 is functioning properly based on a comparison between the key data and a predetermined response stored in the processor check module 44. The processor check module 44 determines that the ALU 36 is operating properly when the key data and the predetermined response (i.e. expected result) are equivalent. In other words, the processor check module 44 performs a diagnostic evaluation of the ALU 36 to ensure proper operation. Further, the processor check module 44 may confirm proper operation of the other components 26 which may include, but is not limited to, various registers, a program counter, and cache.

Portions of the control module 12 may be implemented by one or more ICs or chips. For example, the IC core 28 and the comparison module 30 may be implemented by a single chip. Alternatively, the control module 12 may be implemented as a system on a chip (SOC).

A control system according to the present invention includes a processor having a first IC core and a second IC core. Each IC core utilizes distinct ALUs to generate independent safety-critical control signals, thereby eliminating failures associated with a shared ALU among a plurality of data paths. Additionally, the control system provides optimal portioning of security functions between the first IC core and second IC core and eliminates the necessity of security checks performed by a secondary processor and eliminates the necessity for dual stores to detect and mitigate RAM corruption.

Figure 2:
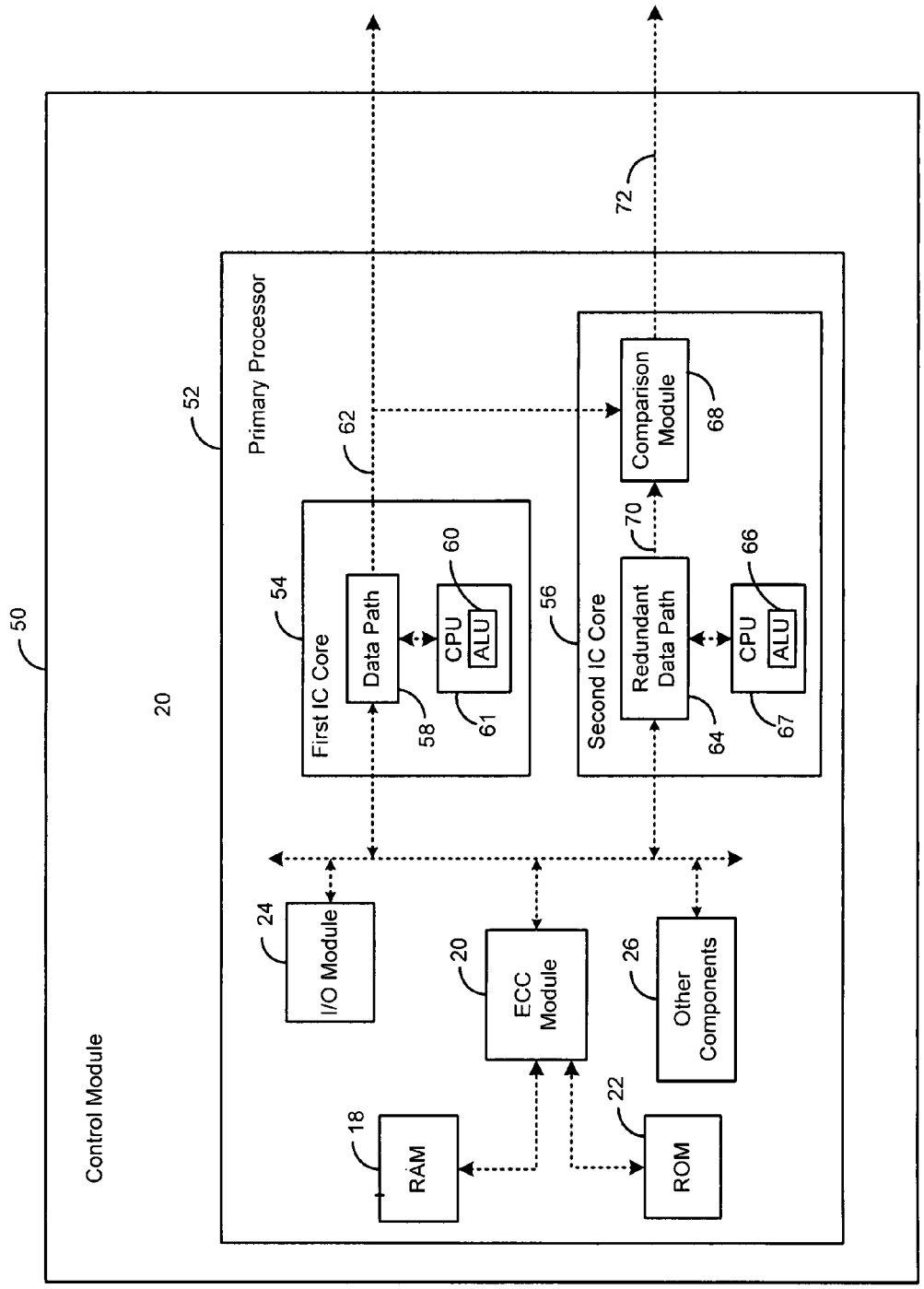
FIG. 2 is a functional block diagram of an exemplary control module according to the present invention.

Referring now to FIG. 2 an exemplary control module 50 that implements the control system according to the present invention is illustrated. The control module 50 includes a processor 52 that includes first IC core 54 and a second IC core 56.

The first IC core 54 includes a data path 58 and an ALU 60. For example, the ALU 60 is a component of a central processing unit (CPU) 61 that calculates arithmetic and logic operations. The data path 58 executes computation operations on data received from various other components within the control module 50 (e.g. the RAM 18 and the RAM 22) and generates a first control signal 62 (e.g. safety-critical control signal) based on the data. The CPU 61 (e.g. the ALU 60) performs arithmetic operations on the data received solely by the data path 58.

The second IC core 56 includes a redundant data path 64, an ALU 66 (i.e. a CPU 67 that includes an ALU 66), and a comparison module 68. The redundant data path 64 processes data in parallel with the data path 58 of the first IC core 54. In the present implementation, the redundant data path 64 uses the CPU 67 to perform arithmetic operations on the data and generates a second control signal 70. In other words, the first IC core 54 (i.e. the data path 58) and the second IC core 56 (i.e. the redundant data path 64) each independently process data using the CPU 61 and the CPU 67 respectively. As a result, a corrupted first control signal generated in-part by a defective CPU 61 of the first IC 54 will not impact the second control signal 70.

In the present implementation, the first IC core 54 and the second IC core 56 process data independently. The second IC core 56 processes data and generates the second control signal 70 based on receiving a notification signal that the first IC core 54 has generated the first control signal 62. In various embodiments, the second IC core 56 may wait a calibrated period of time to receive the first control signal 62. If the second IC core 56 determines that the first control signal 62 has not been received within the period of time, the second IC core 56 may initiate remedial action 72.

The comparison module 68 of the second IC core 56 receives the first and second control signals 62 and 70. The comparison module 68 compares the first and second control signals 62 and 70 and determines whether the first and second control signals 62 and 70 are equivalent. If the first and second control signals 62 and 70 are not equivalent, the comparison module 68 generates a remedial control signal 72 based on the comparison. The remedial control signal 72 can include, but is not limited to, commanding a resynchronization of the data path 58 and the redundant data path 64 to a predetermined state, and/or performing a running reset of the first IC core 54 and the second IC core 56.

The control module 50 transmits the first control signal 62 and the remedial control signal 72 to various components of the control module 50 and/or of the vehicle 10.

In the present implementation, the first and second IC cores 54 and 56 share common RAM 18 and ROM 22. The ECC module 20 monitors the RAM 18 and ROM 22 of the control module 50 for data faults (i.e. data corruption due to hardware failures). At least one of the first core 54 and the second core 56 tests for proper operation of the ECC module 20. In various embodiments, the first core 54 or second core 56 may verify the functionality of the ECC module 20 by ensuring that no "sleeping faults" (i.e. a fault that independently does not cause a safety-critical error) of the ECC module 20 exist at least once per key cycle of the vehicle 10. A sleeping fault of the ECC module 20 manifests as a failure of the ECC module 20 to detect a faulty RAM or ROM cell. A hazard may occur upon a subsequent RAM or ROM fault. Additionally, if the first IC core 54 or second IC core 56 share a common clock, the operation of the clock (not shown) may be periodically verified by one of the first IC core 54, the second IC core 56, and/or external circuitry.

Figure 3:
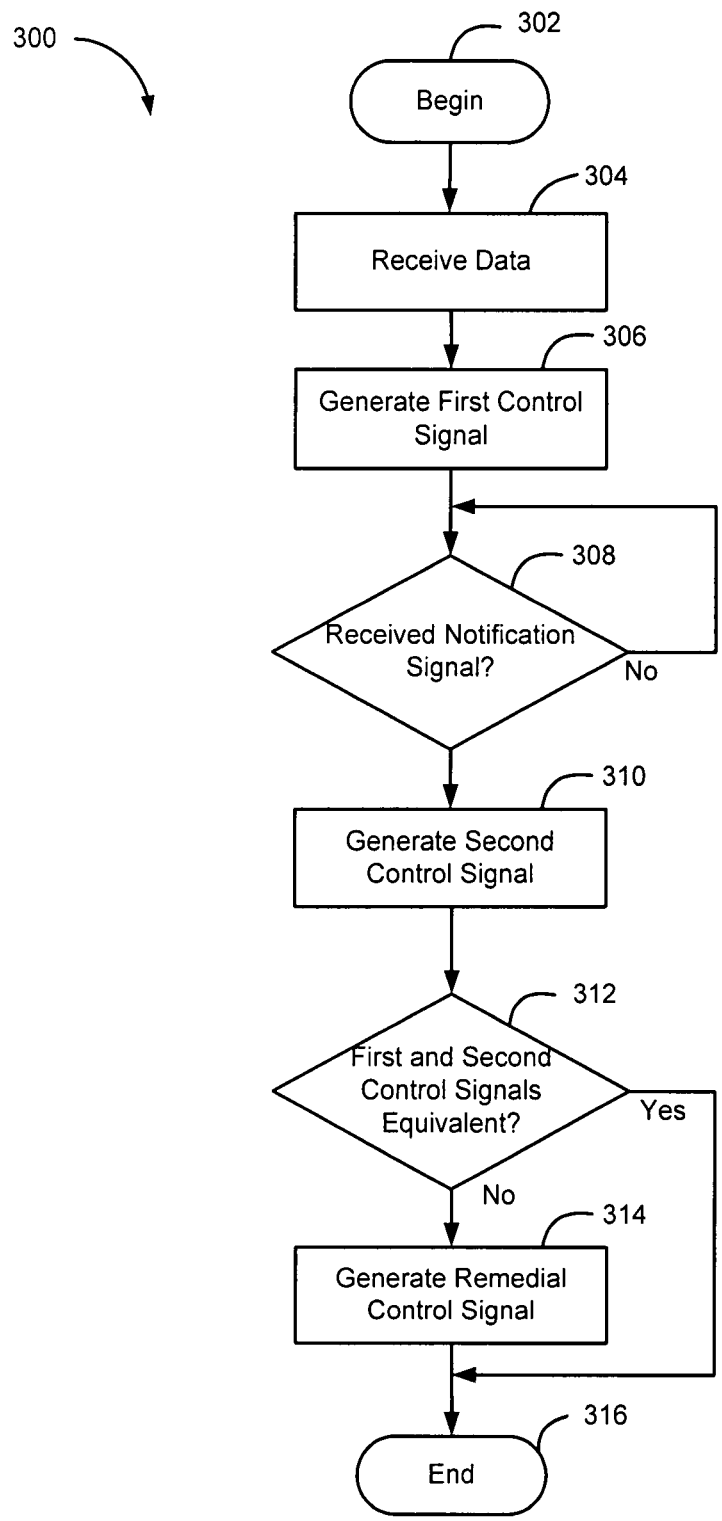
FIG. 3 is a flowchart illustrating the control system of the present invention.

Referring now to FIG. 3, an exemplary method 300 for operating the control system will be described in more detail. The method 300 begins in step 302. In step 304, the first IC core 54 and the second IC core 56 receive data from various components of the control module 50. In step 306, the first IC core 54 generates a first control signal 62. In step 308, the second IC core 56 determines whether the second IC core 56 has received a notification signal transmitted from the first IC core 54. If the second IC core 56 has not received the notification signal, the second IC core 56 returns to step 308. If the second IC core 56 receives the notification signal, the second IC core 56 proceeds to step 310.

In step 310, the second IC core 56 generates a second control signal 70. In step 312, the second IC core 56 determines whether the first control signal 62 and the second control signal 70 are equivalent. If the second IC core 56 determines that the first control signal 62 and the second control signal are not equivalent, the method 300 proceeds to step 314. If the second IC core 56 determines that the first control signal 62 and the second control signal are equivalent, the method 300 proceeds to step 316. In step 314, the second IC core 56 generates a remedial control signal 72. In step 316, the method 300 ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for a control module of a vehicle, comprising:
   a first integrated circuit (IC) core of a primary processor that generates a first control signal using first a central processing unit (CPU); and
   a second IC core of said primary processor that generates a second control signal using a second CPU, and said second IC core generating a remedial control signal based on said first control signal and said second control signal, wherein said second IC core generates said second control signal in response to said second IC core receiving a notification signal from said first IC core indicating that said first IC core has generated said first control signal.

2. The system of claim 1 wherein said second IC core generates said remedial control signal when said second control signal is not equivalent to said first control signal.

3. The system of claim 1 wherein said second IC core commands a remedial action when said second IC core fails to receive said notification signal within a calibrated period.

4. The system of claim 1 wherein said remedial control signal includes at least one of signaling a resynchronization of a data path of said first IC core and a redundant data path of said second IC core to a predetermined state and signaling a running reset of said first IC core and said second IC core.

5. The system of claim 1 wherein said first IC core and said second IC core independently process data.

6. The system of claim 1 further comprising:
   memory; and
   an error correction coding (ECC) module, wherein said first IC core and said second IC core share said memory and said ECC module verifies said memory.

7. The system of claim 6 wherein one of said first IC core and said second IC core verify an operation of said ECC module.

8. The system of claim 1 wherein:
   said first IC core generates said first control signal using a first data path;
   said second IC core generates a second control signal using a second data path; and
   said second data path is redundant relative to said first data path.

9. The system of claim 1 wherein said first and second control signals are associated with controlling an actuator of said vehicle.

10. The system of claim 9 wherein said actuator includes at least one of a brake actuator and a steering actuator.

11. A method for operating a control module of a vehicle, comprising:
    generating a first control signal using a first CPU of a first IC core on a primary processor;
    generating a second control signal using a second CPU of a second IC core on the primary processor in response to said second IC core receiving a notification signal from said first IC core indicating that said first IC core has generated said first control signal; and
    generating a remedial control signal using the second IC core based on said first control signal and said second control signal.

12. The method of claim 11 further comprising generating said remedial control signal when said second control signal is not equivalent to said first control signal.

13. The method of claim 11 further comprising commanding a remedial action when said second IC core fails to receive said notification signal within a calibrated period.

14. The method of claim 11 wherein said remedial control signal includes at least one of signaling a resynchronization of a data path of said first IC core and a redundant data path of said second IC core to a predetermined state and signaling a running reset of said first IC core and said second IC core.

15. The method of claim 11 wherein said first IC core and said second IC core independently process data.

16. The method of claim 11 wherein one of said first IC core and said second IC core verify an operation of an error correction coding (ECC) module of said control module.

17. The method of claim 11 further comprising:
    generating said first control signal using a first data path of said first IC core; and
    generating a second control signal using a second data path of said second IC core, wherein said second data path is redundant relative to said first data path.

18. The method of claim 11 wherein said first and second control signals are associated with controlling an actuator of said vehicle.

19. The method of claim 18 wherein said actuator includes at least one of a brake actuator and a steering actuator.

* * * * *